(12) United States Patent
Nishibe et al.

(10) Patent No.: US 10,173,145 B2
(45) Date of Patent: Jan. 8, 2019

(54) CARBON DIOXIDE SEPARATION SYSTEM

(71) Applicant: KAWASAKI JUKOGYO KABUSHIKI KAISHA, Kobe-shi, Hyogo (JP)

(72) Inventors: Shohei Nishibe, Akashi (JP); Yoshiharu Nonaka, Kobe (JP); Tomoyuki Ogino, Kobe (JP); Takeshi Okumura, Kakogawa (JP); Takatoshi Shoji, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 85 days.

(21) Appl. No.: 15/314,392

(22) PCT Filed: May 13, 2015

(86) PCT No.: PCT/JP2015/002430
§ 371 (c)(1),
(2) Date: Nov. 28, 2016

(87) PCT Pub. No.: WO2015/182052
PCT Pub. Date: Dec. 3, 2015

(65) Prior Publication Data
US 2017/0197174 A1    Jul. 13, 2017

(30) Foreign Application Priority Data

May 28, 2014 (JP) ................. 2014-110030

(51) Int. Cl.
*B01D 53/08* (2006.01)
*B01D 53/62* (2006.01)
(Continued)

(52) U.S. Cl.
CPC ............... *B01D 3/08* (2013.01); *B01D 53/62* (2013.01); *C01B 32/50* (2017.08);
(Continued)

(58) Field of Classification Search
CPC ........ B01D 2253/106; B01D 2257/504; B01D 53/08; B01D 53/62; C01B 32/50;
(Continued)

(56) References Cited

FOREIGN PATENT DOCUMENTS

JP    2013-121562 A    6/2013
JP    2013121562 A  *  6/2013    ............. B01D 53/08

OTHER PUBLICATIONS

Aug. 11, 2015 International Search Report issued in International Patent Application No. PCT/JP2015/002430.
(Continued)

*Primary Examiner* — Cabrena Holecek
(74) *Attorney, Agent, or Firm* — Oliff PLC

(57) ABSTRACT

A treatment tower of a carbon dioxide separation system includes a treatment container of a tower shape, having inner space which is virtually dividable into a regeneration treatment chamber, drying treatment chamber, and adsorption treatment chamber arranged in this order from the top to the bottom, by two hindrances which are upper and lower hindrances and hinder the downward movement of the adsorbent while maintaining the bedded (layered) flow of the adsorbent, a first passage member formed with ejection holes which eject a gas used in a treatment in each of the treatment chambers to a lower portion of each of the treatment chambers, and a second passage member formed with a gas discharge hole which discharges the gas having contacted the adsorbent from an upper portion of each of the treatment chambers. In the two treatment chambers on the lower side, gas discharge holes are formed below the hindrances.

8 Claims, 4 Drawing Sheets

(51) Int. Cl.
 *B01D 3/08* (2006.01)
 *C01B 32/50* (2017.01)
(52) U.S. Cl.
 CPC .. *B01D 2253/106* (2013.01); *B01D 2257/504* (2013.01); *Y02C 10/04* (2013.01); *Y02C 10/06* (2013.01); *Y02C 10/08* (2013.01); *Y02P 20/152* (2015.11)
(58) Field of Classification Search
 CPC ........ Y02C 10/04; Y02C 10/06; Y02C 10/08; Y02P 20/152
 See application file for complete search history.

(56) References Cited

OTHER PUBLICATIONS

Nov. 29, 2016 International Preliminary Report on Patentability issued in International Patent Application No. PCT/JP2015/002430.

\* cited by examiner

CARBON DIOXIDE SEPARATION SYSTEM

TECHNICAL FIELD

The present invention relates to a carbon dioxide separation system which separates carbon dioxide ($CO_2$) from a target gas (gas to be treated) containing the carbon dioxide, such as a coal combustion (burning) exhaust gas.

BACKGROUND ART

Conventionally, a system which separates and recovers carbon dioxide from a target gas by use of an adsorbent is known. For example, Patent Literature 1 discloses a conventional carbon dioxide separation and recovery system 100 as shown in FIG. 4. This conventional carbon dioxide separation and recovery system 100 includes a hopper 110, an adsorption reactor 120, a desorption reactor 130, an adsorbent dryer 140, and a cooling tower 150, which are arranged in this order from the top to the bottom, and a conveyor 160 which transfers an adsorbent from the cooling tower 150 to the hopper 110. The adsorbent stored in the hopper 110 moves downward by its own weight, through the adsorption reactor 120, the desorption reactor 130, the adsorbent dryer 140, and the cooling tower 150, in this order.

In the adsorption reactor 120, the target gas is caused to contact the adsorbent, and the carbon dioxide contained in the target gas is adsorbed to the adsorbent. Steam is supplied from the adsorbent dryer 140 to the desorption reactor 130. This steam is condensed on the adsorbent having adsorbed the carbon dioxide, and thereby the carbon dioxide is desorbed from the adsorbent. The desorbed carbon dioxide is suctioned into a recovery pump 170 through a carbon dioxide recovery passage 135, compressed by the recovery pump 170, and then reserved in a carbon dioxide holder 180. The adsorbent dryer 140 evaporates condensed water adhering to the adsorbent by indirect heating. The steam generated by evaporation of the condensed water is supplied to the desorption reactor 130 as the steam used to regenerate the adsorbent.

CITATION LIST

Patent Literature

Patent Literature 1: Japanese-Laid Open Patent Application Publication No. 2013-121562

SUMMARY OF INVENTION

Technical Problem

In the conventional carbon dioxide separation and recovery system 100 of FIG. 4, discharge devices are provided at the lower portions of at least the adsorption reactor 120, the desorption reactor 130, and the adsorbent dryer 140, respectively, to adjust the amount of the adsorbent discharged from these containers and tower. The conventional carbon dioxide separation and recovery system 100 includes the hopper 110, the adsorption reactor 120, the desorption reactor 130, the adsorbent dryer 140, and the cooling tower 150, which are arranged in a vertical direction, and the plurality of discharge devices. In this construction, it is difficult to reduce the height of the system, and hence the size of the system is unavoidably increased. In addition, the plurality of discharge devices included in the system increase cost of equipment, operation, and maintenance for these discharge devices, which is not cost-efficient.

In view of the above-described circumstances, an object of the present invention is to provide a carbon dioxide separation system which separates and recovers carbon dioxide from a target gas (gas to be treated) by use of an adsorbent, the system being capable of reducing a size while avoiding an increase in cost of equipment, operation, and maintenance.

According to an aspect of the present invention, a carbon dioxide separation system which separates carbon dioxide from a target gas by use of an adsorbent, comprises a treatment tower including: a regeneration treatment chamber in which adsorption/desorption steam is caused to contact the adsorbent having adsorbed the carbon dioxide to desorb the carbon dioxide from the adsorbent, a drying treatment chamber in which a drying gas is caused to contact the adsorbent having contacted the adsorption/desorption steam to dry the adsorbent, and an adsorption treatment chamber in which the target gas is caused to contact the adsorbent to adsorb the carbon dioxide contained in the target gas to the adsorbent, wherein the treatment tower is a treatment container of a tower shape, having a top portion from which the adsorbent is injected into the treatment container and a bottom portion from which the adsorbent is discharged, the treatment container having an inner space which is virtually dividable into the drying treatment chamber and the adsorption treatment chamber by a hindrance which hinders downward movement of the adsorbent while maintaining a bedded flow of the adsorbent, a first passage member formed with an ejection hole which ejects a gas to a lower portion of each of the drying treatment chamber and the adsorption treatment chamber, the gas being used in a treatment in the each of the drying treatment chamber and the adsorption treatment chamber, a second passage member formed with a gas discharge hole which discharges the gas having contacted the adsorbent from an upper portion of the each of the drying treatment chamber and the adsorption treatment chamber, and wherein in the adsorption treatment chamber, the gas discharge hole is opened in a gap which is formed below the hindrance and in which the adsorbent does not exist.

In accordance with the carbon dioxide separation system having the above-described configuration, the drying treatment chamber and the adsorption treatment chamber are provided within one treatment (processing) container. Therefore, the number of treatment containers and the number of discharge devices can be reduced, compared to a conventional system in which the discharge device is provided below the drying treatment chamber as well as the adsorption treatment chamber. With reduction of the number of treatment containers and the number of discharge devices, cost of equipment, operation and maintenance can be reduced. Further, the installation space of the discharge device can be reduced. Since the height of the system can be reduced, the size of the system can be reduced.

According to another aspect of the present invention, a carbon dioxide separation system which separates carbon dioxide from a target gas by use of an adsorbent, comprises: a treatment tower including: a regeneration treatment chamber in which adsorption/desorption steam is caused to contact the adsorbent having adsorbed the carbon dioxide to desorb the carbon dioxide from the adsorbent, a drying treatment chamber in which a drying gas is caused to contact the adsorbent having contacted the adsorption/desorption steam to dry the adsorbent, and an adsorption treatment chamber in which the target gas is caused to contact the adsorbent to adsorb the carbon dioxide contained in the target gas to the adsorbent, wherein the treatment tower is a treatment container of a tower shape, having a top portion from which the adsorbent is injected into the treatment container and a bottom portion from which the adsorbent is discharged, the treatment container having an inner space which is virtually dividable into the regeneration treatment chamber, the drying treatment chamber, and the adsorption treatment chamber by a plurality of hindrances disposed in a vertical direction to hinder downward movement of the adsorbent while maintaining a bedded flow of the adsorbent, the regeneration treatment chamber, the drying treatment chamber, and the adsorption treatment chamber being arranged in this order from a top to a bottom, a first passage member formed with an ejection hole which ejects a gas to a lower portion of each of the regeneration treatment chamber, the drying treatment chamber, and the adsorption treatment chamber, the gas being used in a treatment in the each of the regeneration treatment chamber, the drying treatment chamber and the adsorption treatment chamber, a second passage member formed with a gas discharge hole which discharges the gas having contacted the adsorbent from an upper portion of the each of the regeneration treatment chamber, the drying treatment chamber, and the adsorption treatment chamber, and wherein in the drying treatment chamber and the adsorption treatment chamber, the gas discharge hole is opened in a gap which is formed below each of the hindrances and in which the adsorbent does not exist.

In accordance with the carbon dioxide separation system having the above-described configuration, the adsorption treatment chamber, the regeneration treatment chamber, and the drying treatment chamber are provided within one treatment (processing) container, and one discharge device is provided at the lower portion of the treatment container. Therefore, the number of discharge devices can be reduced, compared to a conventional system in which the discharge device is provided at the lower portion of each of the treatment chambers. With reduction of the number of the discharge devices, manufacturing cost and operation cost of the discharge devices can be reduced. In addition, the installation of the discharge device can be reduced, and the height of the system can be reduced. As a result, the size of the system can be reduced.

In the above-described carbon dioxide separation system, the hindrance may include a taper portion which reduces in a downward direction an area of a passage through which the adsorbent flows. In this case, an angle formed between a generatrix of a taper surface of the taper portion and a vertical direction is desirably larger than 0 degree and less than 60 degrees. In the above-described carbon dioxide separation system, the hindrance may include a plurality of rod-like elements arranged in a direction that is substantially perpendicular to a movement direction of the adsorbent.

In accordance with the above-described carbon dioxide separation system, it becomes possible to realize the hindrance which is capable of maintaining the movement of the adsorbent from the upper treatment chamber to the lower treatment chamber while limiting the movement of the gas from the lower treatment chamber to the upper treatment chamber, with a simple structure and without a need for driving power. As a result, an increase in cost of equipment, operation and maintenance of the carbon dioxide separation system can be reduced.

Advantageous Effects of Invention

In accordance with the present invention, it becomes possible to realize a carbon dioxide separation system which can reduce equipment cost and its size.

DESCRIPTION OF EMBODIMENTS

A carbon dioxide separation system of the present invention is a system which performs a series of operations in such a manner that it selectively separates carbon dioxide from a target gas (gas to be treated) by use of a solid adsorbent, and regenerates the solid adsorbent having been used in the separation. This system may be a carbon dioxide separation and recovery system which additionally performs an operation for recovering the separated carbon dioxide. The target gas is, for example, a combustion exhaust gas. The adsorbent is, for example, a porous material carrying an amine compound. As the porous material, silica gel, active carbon, active alumina, a metal oxide, or the like may be used. Hereinafter, the embodiments of the present invention will be described with reference to the drawings.

Embodiment 1

Figure 1:
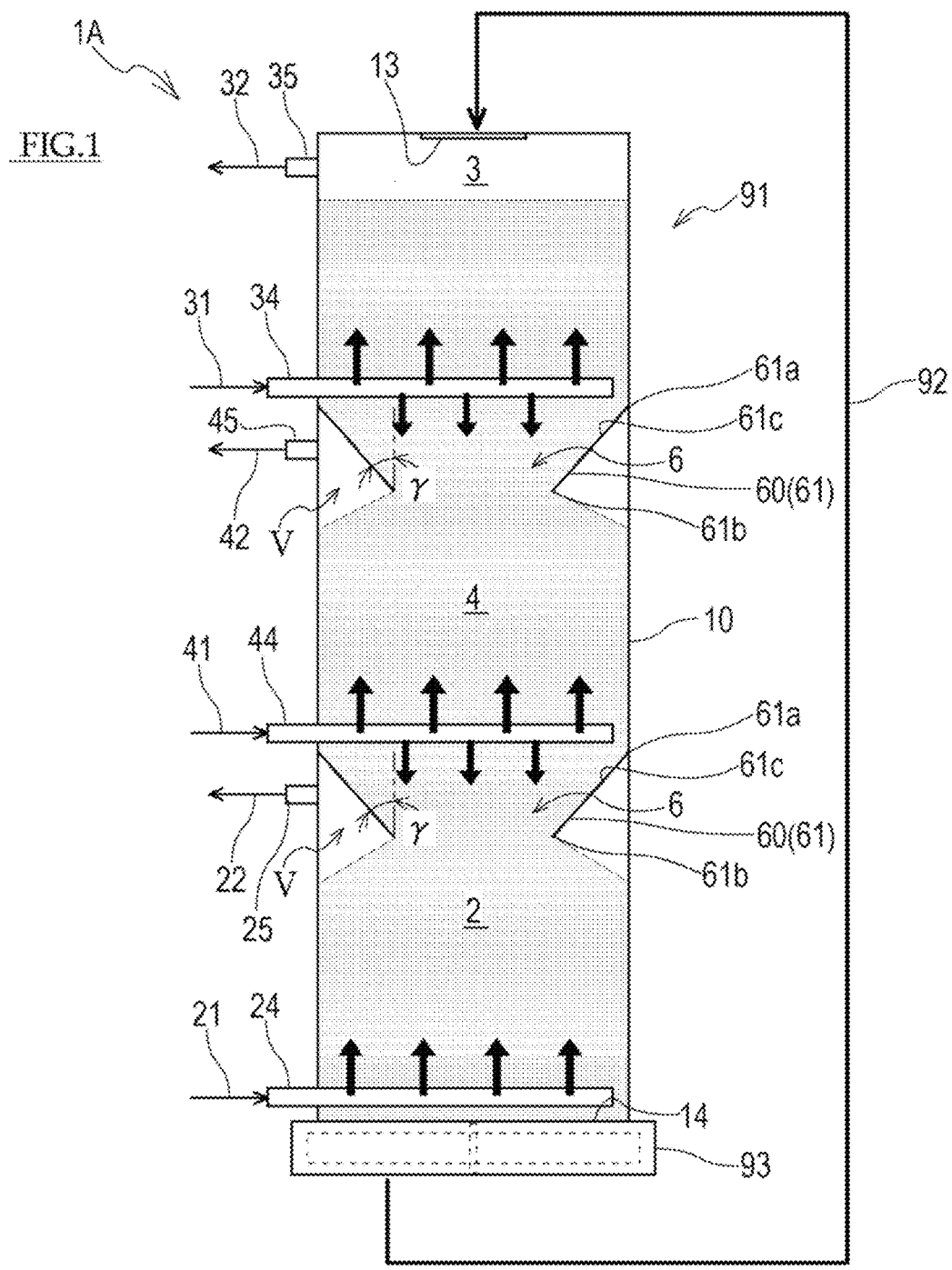
FIG. 1 is a schematic view of the configuration of a carbon dioxide separation system according to Embodiment 1 of the present invention.

FIG. 1 shows a carbon dioxide separation system 1A according to Embodiment 1 of the present invention. The carbon dioxide separation system 1A includes a treatment (processing) tower 91 which adsorbs the carbon dioxide to the adsorbent, regenerates the adsorbent, and dries the adsorbent, and a conveyor 92 which transfers (transports) the adsorbent from the bottom portion of the treatment tower 91 to the top portion of the treatment tower 91.

The treatment tower 91 includes a treatment container 10 of a tower shape, a lengthwise direction of which conforms to a vertical direction. An injection port 13 which injects the adsorbent into the treatment container 10 is provided at the top portion of the treatment container 10. The adsorbent is sent and supplied to the injection port 13 by the conveyor 92. A discharge port 14 which discharges the adsorbent is provided at the bottom portion of the treatment container 10. A discharge device 93 for discharging the adsorbent continuously or intermittently is provided at the discharge port 14. The discharge device 93 according to the present embodiment is a table feeder which discharges the adsorbent from the interior of the treatment container 10 to the conveyor 92 at a constant amount, and includes a rotor having a perpendicular rotational shaft, and a drive means which rotates the rotor. It should be noted that the discharge device 93 is not limited to the table feeder, and a known granular material discharge means such as a rotary feeder may be used as the discharge device 93.

In the treatment container 10, the conveyor 92 and the discharge device 93 operate so that the adsorbent is taken out successively from the discharge port 14, while the adsorbent is newly supplied from the injection port 13 and moves downward by its own weight, from the top portion of the treatment container 10 to the bottom portion of the treatment container 10.

Between the injection port 13 and the discharge port 14 of the treatment container 10, two restriction sections 6 are provided and arranged in the vertical direction, to restrict the flow of the adsorbent. Because of the presence of the restriction sections 6, the cross-sectional area of the inner space of the treatment container 10 with respect to a downward distance is reduced. Each of the restriction sections 6 includes a hindrance 60 which hinders the downward movement of a part of the adsorbent while maintaining the bedded (layered) flow of a moving bed of the adsorbent. The adsorbent, the movement of which is hindered, moves laterally and downward, while circumventing the hindrance 60 or contacting it. For this reason, a gap V in which no adsorbent exists is formed below each of the hindrances 60.

In the present embodiment, each of the restriction sections 6 is configured in such a manner that the hindrance 60 is a taper portion 61 formed in the inner wall of the treatment container 10. The taper portion 61 has an entrance 61a which conforms to the inner wall surface of the treatment container 10 or is close to the inner wall surface of the treatment container 10. The taper portion 61 has a taper surface 61c which makes the treatment container 10 narrower in a downward direction. The taper portion 61 has an exit 61b at a location that is below the entrance 61a in such a manner that the exit 61b has a diameter smaller than that of the entrance 61a.

The treatment container 10 is virtually divided into a regeneration treatment chamber 3 on an upper side and a drying treatment chamber 4 on a lower side, by the hindrance 60 (the taper portion 61 in this example) on the upper side which is a boundary, while the treatment container 10 is virtually divided into the drying treatment chamber 4 on an upper side and an adsorption treatment chamber 2 on a lower side, by the hindrance 60 (the taper portion 61 in this example) on a lower side which is a boundary. The term "virtually divided" means that an object (e.g., shutter or the like) which defines the treatment chambers does not exist actually, and the upper treatment chamber and the lower treatment chamber are directly in communication with each other.

The adsorption treatment chamber 2 is a treatment chamber in which the target gas is caused to contact the adsorbent. A passage member 24 formed with ejection holes which eject the target gas is provided at the lower portion of the adsorption treatment chamber 2. The passage member 24 is connected to a target gas supply passage 21. A passage member 25 formed with gas discharge holes which discharge the target gas is provided at the upper portion of the adsorption treatment chamber 2. The passage member 25 is connected to a target gas discharge passage 22. The gas discharge holes provided at the upper portion of the adsorption treatment chamber 2 are opened in the gap V which is formed below the hindrance 60 and in which the adsorbent does not exist.

The target gas is supplied to the adsorption treatment chamber 2 through the target gas supply passage 21. In the interior of the adsorption treatment chamber 2, the adsorbent moves downward and the target gas flows upward, namely, in a direction opposite to the flow direction of the adsorbent. In this way, in the interior of the adsorption treatment chamber 2, a countercurrent flow moving bed is formed, and the adsorbent and the target gas contact each other successively. By the contact between the adsorbent and the target gas, the carbon dioxide contained in the target gas is adsorbed to the adsorbent.

Since the restriction section 6 is provided between the adsorption treatment chamber 2 and the drying treatment chamber 4, the gap V in which the adsorbent does not exist is formed below the hindrance 60. A gas existing below the hindrance 60 is guided to flow to the gap V with a low pressure loss. Therefore, almost all of the target gas flowing upward in the adsorption treatment chamber 2 flows to the gap V, and is discharged from the gas discharge holes in the adsorption treatment chamber 2 to outside through the target gas discharge passage 22. In other words, the target gas from which the carbon dioxide has been removed due to the contact with the adsorbent in the adsorption treatment chamber 2, does not substantially flow from the adsorption treatment chamber 2 into the drying treatment chamber 4. The adsorbent having adsorbed the carbon dioxide is transferred to the regeneration treatment chamber 3.

In order to form the above-described flow of the target gas in the restriction section 6, an angle $\gamma$ formed between a generatrix of the taper surface 61c of the conical taper portion 61, and a vertical direction, is desirably in a range of 0 degree to 60 degrees (0 degree<$\gamma$<60 degrees). If the angle $\gamma$ is equal to or less than 0 degree, the taper portion 61 is unable to function as the restriction section 6, and a pressure loss difference between the gap V and the drying treatment chamber 4 is not generated. As a result, the amount of gas which becomes the countercurrent flow in the drying treatment chamber 4 is reduced. In addition, the target gas flows from the adsorption treatment chamber 2 into the drying treatment chamber 4. This reduces drying efficiency. In contrast, if the angle $\gamma$ is equal to or larger than 60 degrees, then an angle formed between the taper surface 61c and a horizontal plane becomes smaller than a repose angle, which may cause stagnancy or segregation of the adsorbent in the taper portion 61. It is known that the repose angle is determined depending on the size of particles (granules), the roundness of corners of the particles or the shape of the particles. In a reference example, the repose angle of the adsorbent (e.g., silica gel) with a mean particle diameter of 3 mm is about 30 degrees. In this case, if the angle $\gamma$ is larger than 60 degrees, then the angle formed between the taper surface 61c and the horizontal plane becomes smaller than the repose angle, which may cause stagnancy or segregation of the adsorbent in the taper portion 61. In the above example, the mean particle diameter is defined as a particle diameter (median diameter) in a case where a relative particle amount of a volume reference found when samples are measured and a particle size distribution (cumulative distribution) is found by use of a particle size distribution measurement device which uses laser diffraction and diffusion method in a measurement principle is 50%. Although not explicitly described, the adsorbent and its mean particle diameter are not limited to the above-described reference example. Although the taper surface 61c of the taper portion 61 according to the present embodiment has a linear taper shape in which a diameter changes linearly with respect to a distance, the taper surface 61c may have a taper shape of an exponent function or a parabola.

The regeneration treatment chamber 3 is a treatment chamber in which steam for adsorption/desorption (adsorption/desorption steam) is caused to contact the adsorbent. A passage member 34 formed with ejection holes which eject the adsorption/desorption steam is provided at the lower portion of the regeneration treatment chamber 3. The passage member 34 is connected to an adsorption/desorption steam supply passage 31. A passage member 35 formed with gas discharge holes which discharge the gas containing the carbon dioxide is provided at the upper portion of the regeneration treatment chamber 3. The passage member 35 is connected to a carbon dioxide recovery passage 32. The adsorption/desorption steam is supplied to the regeneration treatment chamber 3 at a normal pressure and a temperature of 100 degrees or higher through the adsorption/desorption steam supply passage 31.

In the interior of the regeneration treatment chamber 3, the adsorption/desorption steam flows upward, namely, in a direction opposite to the flow direction of the adsorbent. In this way, in the interior of the regeneration treatment chamber 3, a countercurrent flow moving bed is formed, and the adsorbent and the adsorption/desorption steam contact each other successively. By the contact between the adsorbent and the adsorption/desorption steam, the steam contained in the adsorption/desorption steam is condensed on the adsorbent, and thereby the carbon dioxide is desorbed from the adsorbent. The amount of the steam contained in the adsorption/desorption steam is such that almost all of the steam contained in the adsorption/desorption steam is condensed on the adsorbent. The carbon dioxide having been desorbed from the adsorbent and the carbon dioxide contained in the adsorption/desorption steam are discharged through the carbon dioxide recovery passage 32. The adsorbent to which the condensed water adheres is transferred to the drying treatment chamber 4.

The drying treatment chamber 4 is a treatment chamber in which the adsorbent having contacted the adsorption/desorption steam is dried. In the present embodiment, the adsorbent is dried by direct heating which causes a drying gas to contact the adsorbent. Alternatively, the adsorbent may be dried by indirect heating in which a heat medium is flowed through a pipe inserted into the drying treatment chamber 4. As the heat medium used for the indirect heating, for example, the carbon dioxide discharged from the regeneration treatment chamber 3, the adsorption/desorption steam before being supplied to the regeneration treatment chamber 3, or the like, may be used.

A drying gas supply passage 41 is connected to the lower portion of the drying treatment chamber 4, and a drying gas discharge passage 42 is connected to the upper portion of the drying treatment chamber 4. A passage member 44 formed with ejection holes which eject the drying gas is provided at the lower portion of the drying treatment chamber 4. The passage member 44 is connected to the drying gas supply passage 41. A passage member 45 formed with gas discharge holes which discharge the drying gas is provided at the upper portion of the drying treatment chamber 4. The passage member 45 is connected to a drying gas discharge passage 42. The gas discharge holes provided at the upper portion of the drying treatment chamber 4 are opened in the gap V which is formed below the hindrance 60 and in which the adsorbent does not exist.

The drying gas is supplied to the drying treatment chamber 4 through the drying gas supply passage 41. In the interior of the drying treatment chamber 4, the drying gas flows upward, namely, in a direction opposite to the flow direction of the adsorbent. In this way, in the interior of the drying treatment chamber 4, a countercurrent flow moving bed is formed, and the adsorbent and the drying gas contact each other successively. By the contact between the adsorbent and the drying gas, the condensed water adhering to the adsorbent is evaporated.

Since the restriction section 6 is provided between the drying treatment chamber 4 and the regeneration treatment chamber 3, the gap V in which the adsorbent does not exist is formed below the hindrance 60. A gas existing below the hindrance 60 is guided to flow to the gap V with a low pressure loss. Therefore, almost all of the drying gas flowing upward in the drying treatment chamber 4 flows to the gap V. The steam generated by evaporation of the condensed water is discharged from the gas discharge holes of the drying treatment chamber 4 to outside through a drying gas discharge passage 42, together with the drying gas. In other words, the drying has having contacted the adsorbent in the drying treatment chamber 4 does not substantially flow from the drying treatment chamber 4 into the regeneration treatment chamber 3.

As drying of the adsorbent in the drying treatment chamber 4 progresses, the temperature of the adsorbent is gradually reduced to the wet-bulb temperature of the drying gas, due to the evaporation of the condensed water adhering to the adsorbent. After that, the temperature of the adsorbent is maintained at the wet-bulb temperature of the drying gas during the evaporation of the condensed water. The drying gas is adjusted so that the wet-bulb temperature of the drying gas reaches the temperature (e.g., about 40 degrees C.) of the adsorbent being injected into the adsorption treatment chamber 2. The adsorbent having been dried is transferred to the adsorption treatment chamber 2.

In the carbon dioxide separation system 1A having the above-described configuration, the adsorption treatment chamber 2, the regeneration treatment chamber 3, and the drying treatment chamber 4 are provided in the interior of one treatment container 10, and one discharge device 93 is provided at the lower portion of the treatment container 10. Since the plurality of treatment chambers are provided within the one treatment container 10 in this way, the number of treatment containers can be reduced, compared to the conventional case where the treatment tower 91 is provided with the plurality of treatment containers. With reduction of the number of treatment containers, equipment cost of the treatment tower 91 can be reduced, and the treatment tower 91 whose height is reduced can be manufactured. With reduction of the number of the treatment containers, the number of discharge devices can be reduced, compared to the above-described conventional case. With reduction of the number of the discharge devices, cost of equipment, operation, and maintenance for these discharge devices, can be reduced. Further, with reduction of the number of the discharge devices, the treatment tower 91 whose height is reduced can be manufactured, and hence a size of the system can be reduced.

In the above-described carbon dioxide separation system 1A, the moving bed which flows continuously is formed in the regeneration treatment chamber 3, the drying treatment chamber 4, and the adsorption treatment chamber 2 within the treatment container 10. Specifically, the movement of the gas is limited by the restriction section 6, whereas the movement of the adsorbent is not limited. Therefore, the bedded (layered) flow of the moving bed of the adsorbent is maintained, and the adsorbent does not become stagnant in the regeneration treatment chamber 3, the drying treatment chamber 4, and the adsorption treatment chamber 2.

Embodiment 2

Figure 2:
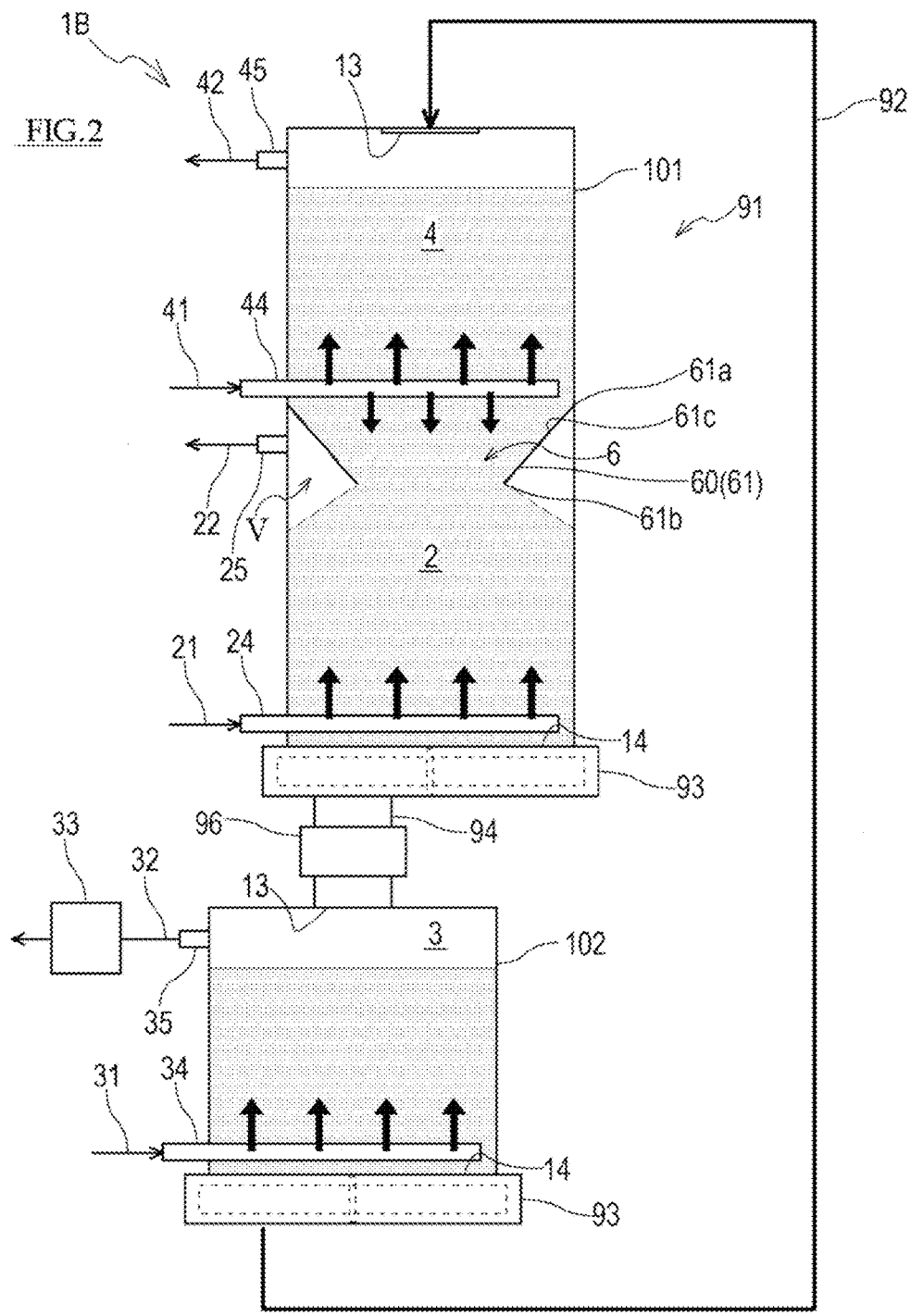
FIG. 2 is a schematic view of the configuration of a carbon dioxide separation system according to Embodiment 2 of the present invention.

Next, Embodiment 2 of the present invention will be described. FIG. 2 shows a carbon dioxide separation system 1B according to Embodiment 2 of the present invention. In the above-described carbon dioxide separation system 1A according to Embodiment 1, the adsorption/desorption steam is supplied to the regeneration treatment chamber 3 at a normal pressure, and there is no pressure difference among the adsorption treatment chamber 2, the regeneration treatment chamber 3, and the drying treatment chamber 4. For this reason, the adsorption treatment chamber 2, the regeneration treatment chamber 3, and the drying treatment chamber 4 can be formed within one continuous space. In contrast, in the carbon dioxide separation system 1B according to Embodiment 2, the adsorption/desorption steam is saturated steam having a temperature of about 60 degrees C. and an absolute pressure of about 20 [kPa]. For this reason, the drying treatment chamber 4 and the adsorption treatment chamber 2 which are in a normal pressure state are provided within one treatment container, while the regeneration treatment chamber 3 in a gauge pressure and negative pressure state is provided within another treatment container. Hereinafter, the carbon dioxide separation system 1B according to Embodiment 2 will be described in detail. In the description below, the same or corresponding members as those of Embodiment 1 are designated by the same reference symbols, and will not be described repeatedly.

As shown in FIG. 2, the carbon dioxide separation system 1B includes the treatment (processing) tower 91 which adsorbs the carbon dioxide to the adsorbent, regenerates the adsorbent, and dries the adsorbent, and the conveyor 92 which transfers (transports) the adsorbent from the bottom portion of the treatment tower 91 to the top portion of the treatment tower 91.

The treatment tower 91 includes two treatment containers 101, 102 of a tower shape which are arranged in the vertical direction. The injection ports 13 which inject the adsorbent into the treatment containers 101, 102 are provided at the top portions of the treatment containers 101, 102, respectively. The discharge ports 14 of the adsorbent are provided at the bottom portions of the treatment containers 101, 102, respectively. Discharge devices 93 which discharge the adsorbent continuously or intermittently are provided at the discharge ports 14, respectively. Each of the discharge devices 93 according to the present embodiment is a table feeder which discharges the adsorbent from the interior of the treatment container 101, 102 to the conveyor 92 at a constant amount, and includes a rotor having a perpendicular rotational shaft, and a drive means which rotates the rotor. It should be noted that the discharge device 93 is not limited to the table feeder, and a known granular material discharge means such as a rotary feeder may be used as the discharge device 93.

The adsorbent discharged from the discharge port 14 of the second treatment container 102 is sent and supplied to the injection port 13 of the first treatment container 101 by the conveyor 92. The adsorbent discharged from the discharge port 14 of the first treatment container 101 is sent and supplied to the injection port 13 of the second treatment container 102 through a transfer pipe 94. In this way, in the treatment containers 101, 102, the conveyor 92 and the discharge devices 93 operate so that the adsorbent is taken out successively from the discharge ports 14, while the adsorbent is newly supplied from the injection ports 13 and moves downward by its own weight, from the top of each of the treatment containers 101, 102 to the bottom of each of the treatment containers 101, 102.

Between the injection port 13 and the discharge port 14 of the first treatment container 101, the restriction section 6 is provided to reduce the cross-sectional area of the inner space of the treatment container 101, 102. The restriction section 6 is provided with the taper portion 61 as the hindrance 60 which hinders the downward movement of the adsorbent while maintaining the bedded (layered) flow of the moving bed of the adsorbent. The interior of the first treatment container 101 is virtually divided into the drying treatment chamber 4 on the upper side and the adsorption treatment chamber 2 on the lower side, at the exit 61b of the taper portion 61 which is a boundary.

The drying gas is supplied to the drying treatment chamber 4 through the drying gas supply passage 41, and the condensed water adhering to the adsorbent is evaporated. The steam generated by evaporation of the condensed water is discharged through the drying gas discharge passage 42, together with the drying gas. The adsorbent having been dried is transferred to the adsorption treatment chamber 2.

The target gas is supplied to the adsorption treatment chamber 2 through the target gas supply passage 21. The carbon dioxide contained in the target gas is adsorbed to the adsorbent. The target gas from which the carbon dioxide has been removed, is discharged through the target gas discharge passage 22. The adsorbent having adsorbed the carbon dioxide is transferred to the regeneration treatment chamber 3. It should be noted that the adsorbent moves by its own weight from the adsorption treatment chamber 2 to the regeneration treatment chamber 3, namely, from the first treatment container 101 to the second treatment container 102.

In the interior of the first treatment container 101, the regeneration treatment chamber 3 is formed. The saturated steam having a temperature of about 60 degrees C. and an absolute pressure of about 20 kPa is supplied to the regeneration treatment chamber 3 through the adsorption/desorption steam supply passage 31. The interior of the regeneration treatment chamber 3 is suctioned by a suction pump 33 to have a negative pressure (gauge pressure) at which the condensed water can be evaporated by the saturated steam. For this reason, a differential pressure holding device 96 (e.g., lock hopper) for holding a pressure difference with respect to an atmospheric pressure is provided between the first treatment container 101 and the second treatment container 102. The carbon dioxide having been desorbed from the adsorbent and the carbon dioxide contained in the adsorption/desorption steam are discharged through the carbon dioxide recovery passage 32. The adsorbent to which the condensed water adheres is transferred to the drying treatment chamber 4 by the conveyor 92.

In the carbon dioxide separation system 1B having the above-described configuration, the drying treatment chamber 4 and the adsorption treatment chamber 2 are provided within the first treatment container 101 which is one treatment container. Therefore, the number of the treatment containers and the number of discharge devices can be reduced, compared to the conventional system in which the discharge device is provided below the drying treatment chamber 4 as well as the adsorption treatment chamber 2. With reduction of the number of the treatment containers and the number of discharge devices, cost of equipment, operation and maintenance can be reduced. Further, it becomes possible to form the treatment tower 91 whose height can be reduced, and hence reduce the size of the system.

Thus far, the preferred embodiments of the present invention have been described. The above-described configuration may be modified as follows.

For example, although in the above-described embodiments, the hindrance 60 constituting the restriction section 6 is the taper portion 61, the hindrance 60 is not limited to this.

Figure 3:
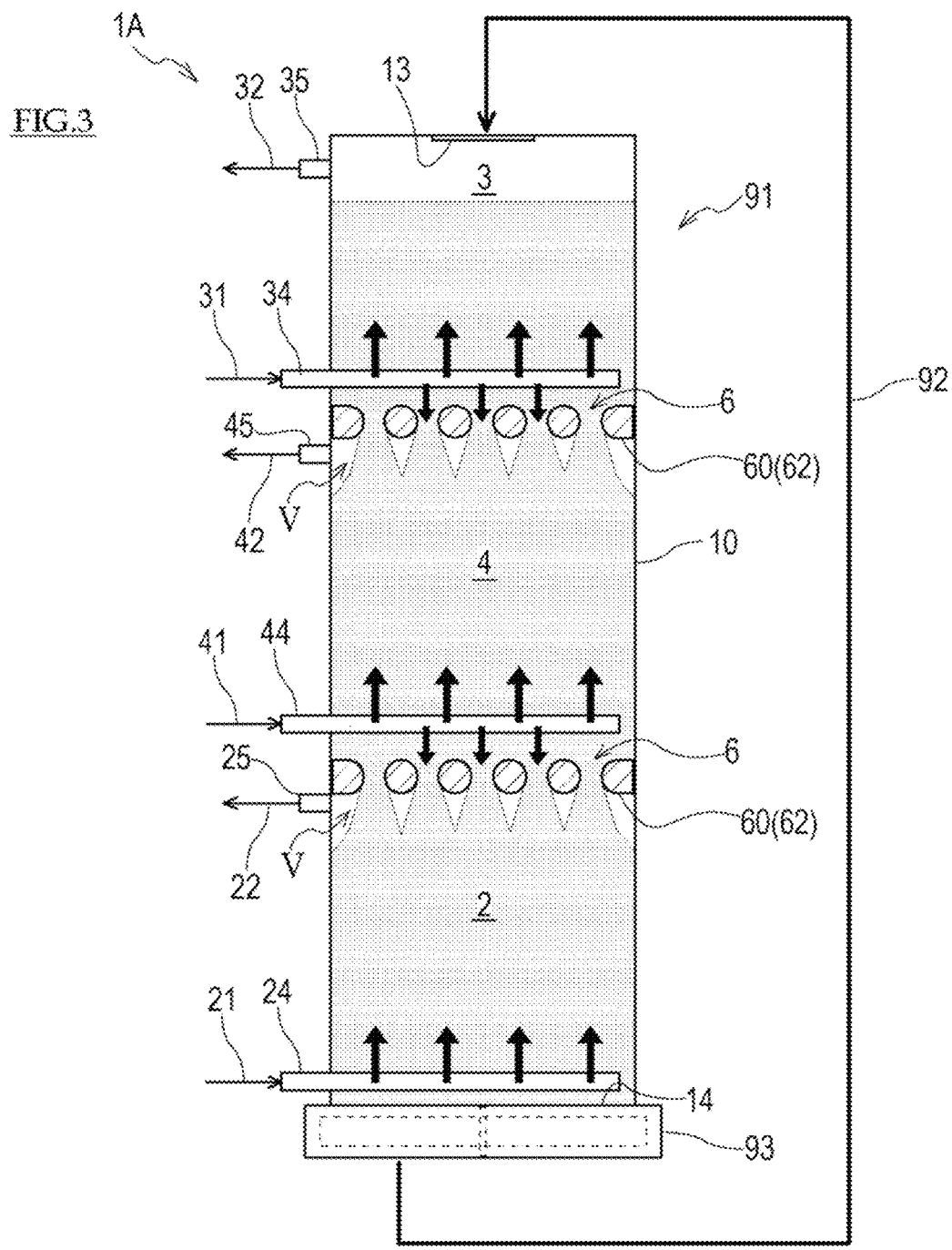
FIG. 3 is a schematic view of the configuration of a carbon dioxide separation system, showing a modified example of a restriction section.
Figure 4:
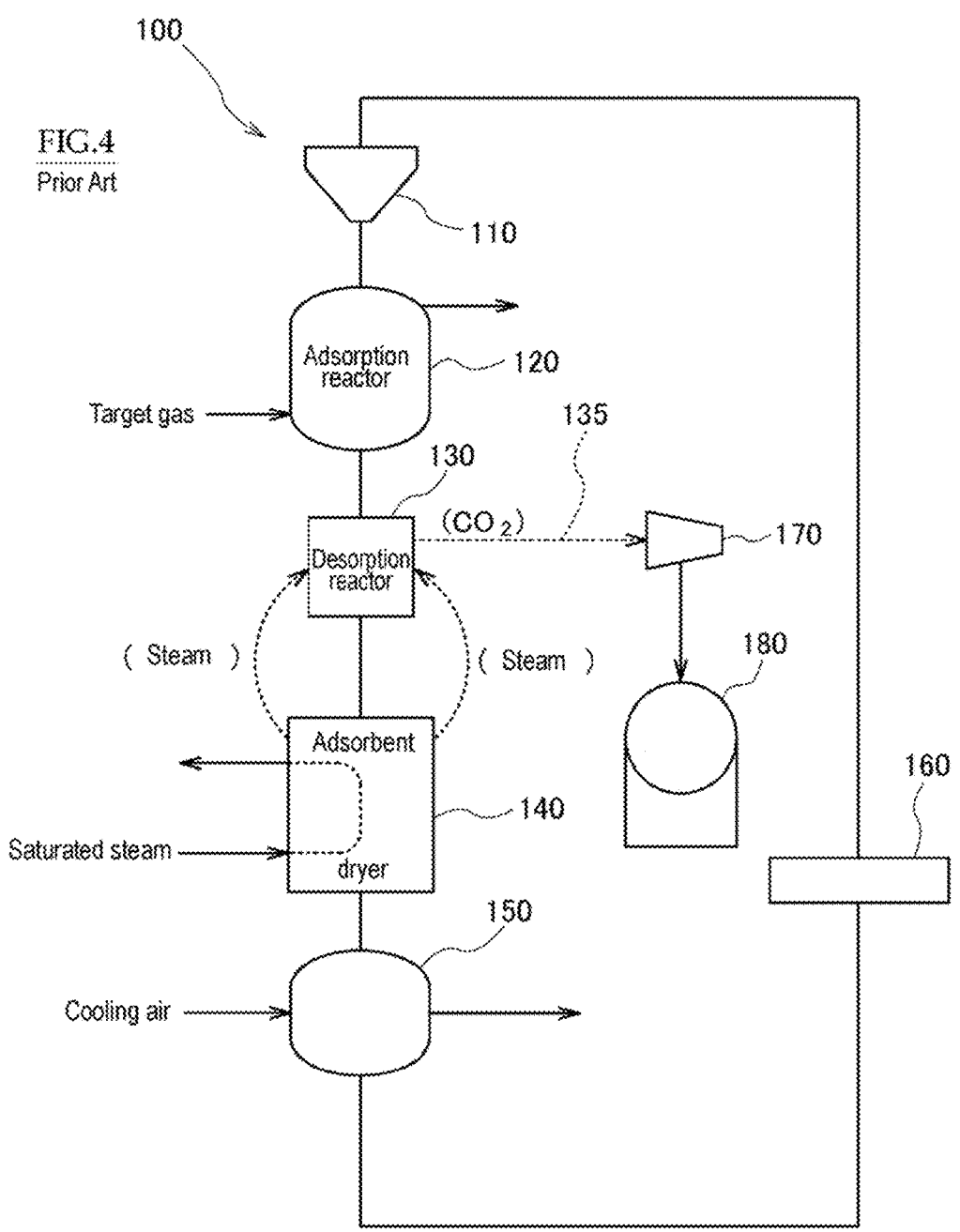
FIG. 4 is a schematic view of the configuration of a conventional carbon dioxide separation and recovery system.

For example, as shown in FIG. 3, the hindrance 60 may include a plurality of rod-like elements 62 arranged in the direction (horizontal direction in this example) which is substantially perpendicular to the movement direction of the adsorbent. In this case, at least one rod-like element 62 is disposed immediately above the gas discharge holes of the adsorption treatment chamber 2 and the gas discharge holes of the drying treatment chamber 4 in such a manner that the gaps V in which the adsorbent does not exist are formed in the gas discharge holes of the adsorption treatment chamber 2, the gas discharge holes of the drying treatment chamber 4, and the regions which are in the vicinity thereof.

Each of the rod-like elements 62 has a surface facing upward which is inclined in a downward direction. This allows the adsorbent which is in contact with the upper side of each of the rod-like elements 62 to move downward along the surface of the rod-like element 62. The longitudinal sectional shape of each of the rod-like elements 62 of FIG. 2 is a circular shape. Alternatively, the longitudinal sectional shape of each of the rod-like elements 62 may be a semi-circular shape, a triangular shape or a rectangular shape.

Although in the example of FIG. 3, the plurality of rod-like elements 62 are arranged at a single stage in the vertical direction, the restriction section 6 may be provided with the plurality of rod-like elements 62 arranged at plural stages in the vertical direction. Although the plurality of rod-like elements 62 are arranged in one direction, the plurality of rod-like elements 62 may be arranged to cross each other like a net shape when viewed from above (in a plan view).

For example, in the above-described embodiments, one adsorption treatment chamber 2, one regeneration treatment chamber 3, and one drying treatment chamber 4 are provided. It should be noted that the restriction section 6 may be further provided in at least one of the adsorption treatment chamber 2, the regeneration treatment chamber 3, and the drying treatment chamber 4 in such a manner that the treatment chamber is virtually divided into a plurality of regions by the hindrance 60 constituting the restriction section 6 which is a boundary.

REFERENCE SIGNS LIST 1A, 1B carbon dioxide separation system
2 adsorption treatment chamber
3 regeneration treatment chamber
4 drying treatment chamber
10 treatment container
101 first treatment container
102 second treatment container
6 restriction section
60 hindrance
61 taper portion
62 rod-like element
91 treatment tower
92 conveyor
93 discharge device
94 transfer pipe

The invention claimed is:

1. A carbon dioxide separation system which separates carbon dioxide from a target gas by use of an adsorbent, the carbon dioxide separation system comprising:
  a treatment tower including:
    a regeneration treatment chamber in which desorption steam is caused to contact the adsorbent having adsorbed the carbon dioxide to desorb the carbon dioxide from the adsorbent,
    a drying treatment chamber in which a drying gas is caused to contact the adsorbent having contacted the desorption steam to dry the adsorbent, and
    an adsorption treatment chamber in which the target gas is caused to contact the adsorbent to adsorb the carbon dioxide contained in the target gas to the adsorbent,
  wherein the treatment tower is a treatment container of a tower shape, having a top portion from which the adsorbent is injected into the treatment container and a bottom portion from which the adsorbent is discharged, the treatment container having an inner space which is divided into the drying treatment chamber and the adsorption treatment chamber by a hindrance which constitutes a restriction section that reduces a cross-sectional area of the inner space of the treatment container and hinders downward movement of the adsorbent while maintaining a bedded flow of the adsorbent,
  a first passage member formed with an ejection hole which ejects a gas to a lower portion of each of the drying treatment chamber and the adsorption treatment chamber, the gas being used in a treatment in the each of the drying treatment chamber and the adsorption treatment chamber,
  a second passage member formed with a gas discharge hole which discharges the gas having contacted the adsorbent from an upper portion of the each of the drying treatment chamber and the adsorption treatment chamber, and
  wherein in the adsorption treatment chamber, the gas discharge hole is opened in a gap which is formed below the hindrance and in which the adsorbent does not exist.

2. A carbon dioxide separation system which separates carbon dioxide from a target gas by use of an adsorbent, the carbon dioxide separation system comprising:
  a treatment tower including:
    a regeneration treatment chamber in which desorption steam is caused to contact the adsorbent having adsorbed the carbon dioxide to desorb the carbon dioxide from the adsorbent,
    a drying treatment chamber in which a drying gas is caused to contact the adsorbent having contacted the desorption steam to dry the adsorbent, and
    an adsorption treatment chamber in which the target gas is caused to contact the adsorbent to adsorb the carbon dioxide contained in the target gas to the adsorbent,
  wherein the treatment tower is a treatment container of a tower shape, having a top portion from which the adsorbent is injected into the treatment container and a bottom portion from which the adsorbent is discharged, the treatment container having an inner space which is divided into the regeneration treatment chamber, the drying treatment chamber, and the adsorption treatment chamber by a plurality of hindrances disposed in a vertical direction to constitute a restriction section that reduces a cross-sectional area of the inner space of the treatment container and hinder downward movement of the adsorbent while maintaining a bedded flow of the adsorbent, the regeneration treatment chamber, the drying treatment chamber, and the adsorption treatment chamber being arranged in this order from a top to a bottom,
  a first passage member formed with an ejection hole which ejects a gas to a lower portion of each of the regeneration treatment chamber, the drying treatment chamber, and the adsorption treatment chamber, the gas being used in a treatment in the each of the regeneration treatment chamber, the drying treatment chamber, and the adsorption treatment chamber, a second passage member formed with a gas discharge hole which discharges the gas having contacted the adsorbent from an upper portion of the each of the regeneration treatment chamber, the drying treatment chamber, and the adsorption treatment chamber, and wherein in the drying treatment chamber and the adsorption treatment chamber, the gas discharge hole is opened in a gap which is formed below each of the hindrances and in which the adsorbent does not exist.

3. The carbon dioxide separation system according to claim 1,
wherein the hindrance includes a taper portion which reduces in a downward direction an area of a passage through which the adsorbent flows.

4. The carbon dioxide separation system according to claim 3,
wherein an angle formed between a generatrix of a taper surface of the taper portion and a vertical direction is larger than 0 degree and less than 60 degrees.

5. The carbon dioxide separation system according to claim 1,
wherein the hindrance includes a plurality of rod-like elements arranged in a direction that is substantially perpendicular to a movement direction of the adsorbent.

6. The carbon dioxide separation system according to claim 2,
wherein the hindrance includes a taper portion which reduces in a downward direction an area of a passage through which the adsorbent flows.

7. The carbon dioxide separation system according to claim 6,
wherein an angle formed between a generatrix of a taper surface of the taper portion and a vertical direction is larger than 0 degree and less than 60 degrees.

8. The carbon dioxide separation system according to claim 2,
wherein the hindrance includes a plurality of rod-like elements arranged in a direction that is substantially perpendicular to a movement direction of the adsorbent.

* * * * *